Jan. 4, 1938. E. T. LARKIN 2,104,347
PISTON
Filed Sept. 16, 1935
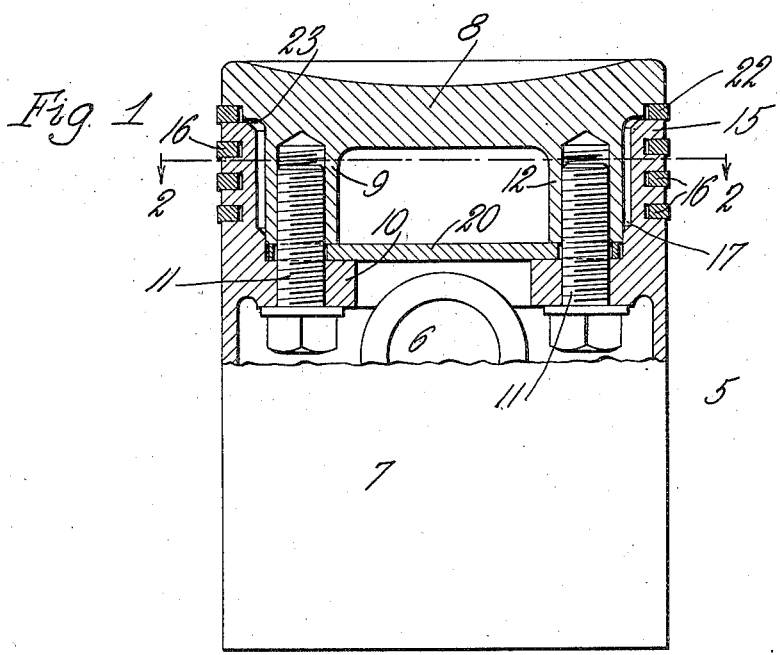
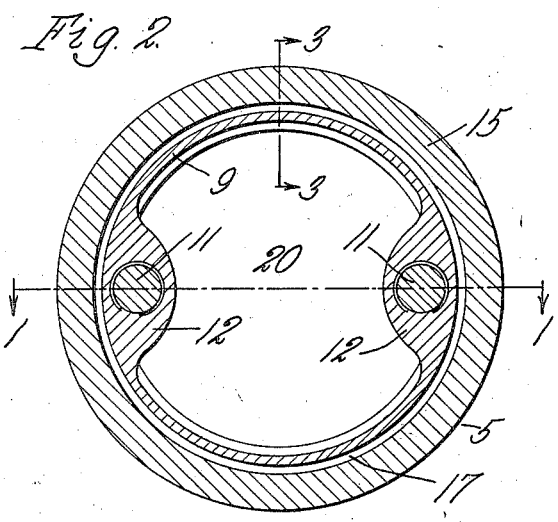
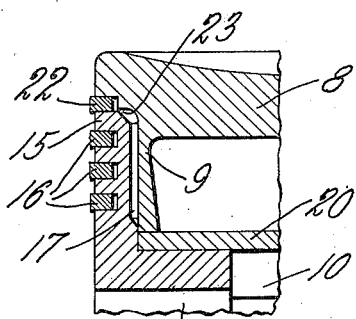
INVENTOR
Elwood T. Larkin
by Parker, Pinchnow & Harmer
ATTORNEYS Patented Jan. 4, 1938

2,104,347

UNITED STATES PATENT OFFICE 2,104,347

PISTON

Elwood T. Larkin, Eggertsville, N. Y., assignor to Charles A. Criqui, Buffalo, N. Y.

Application September 16, 1935, Serial No. 40,771

5 Claims. (Cl. 309—15)

This invention relates to pistons of the kind used in internal combustion engines.

The objects of this invention are to provide a piston of this kind of improved construction in which the head of the piston may operate at high temperatures without excessive heating of other parts of the piston; also to provide a piston in which the ring zone and skirt is maintained at a relatively low temperature to provide for improved lubrication between the piston and the cylinder wall; also to provide a piston in which the upper or fire ring will be kept relatively free from carbon to enable this ring to operate continuously to protect the lower rings from the hot gases of the combustion chamber; also to provide a piston in which the upper side of a fire ring may operate in an atmosphere sufficiently elevated in temperature to burn carbon deposited thereon during portions of the cycle but without damage to the ring and without producing excessive temperatures of the other rings; also to provide a piston comprising a body having a head secured thereto in such a manner that a space is formed between all but the inner portion of the head and body, which space resists the passage of heat from the head to the ring zone of the body; also to provide a piston in which a heat insulating space between the head and body terminates in a groove for a piston ring; also to provide a piston in which portions of the head and body are spaced apart to form a groove for the upper or fire ring of the piston; also to provide a piston of such construction that the same may be proportioned to obtain any desired distribution of the heat from the head to the body thereof; also to improve the construction of pistons in other respects hereinafter specified.

In the accompanying drawing:

Fig. 1 is an elevation, partly in section, on line 1—1, of Fig. 2, of a piston embodying this invention.

Fig. 2 is a transverse section thereof on line 2—2, Fig. 1.

Fig. 3 is a fragmentary section thereof on line 3—3, Fig. 2.

This invention may be applied to pistons of many different kinds and the drawing illustrates by way of example a piston having a hollow cylindrical body 5 provided with the usual connecting rod pin bearings 6 and a downwardly extending skirt 7. 8 represents in general the head of the piston, the upper end of which is of a diameter approaching closely to the diameter of the piston. The head has a neck portion 9 of reduced diameter, the lower part of which may be secured to the body in any suitable manner. For example, the body may have an inwardly extending portion or shelf 10 through which screws 11 extend which engage in threaded holes formed in the neck.

Since it is very desirable, in order to insure efficient operation of an engine, to have the head of the cylinder operate at high temperatures, and since high temperatures are decidedly detrimental in maintaining proper lubrication between the cylinder and piston rings, I provide means for maintaining the piston head 8 at high temperatures by separating the piston head and the greater part of the neck 9 thereof from the body of the piston and also in so constructing the neck as to restrict the amount of heat which is conducted through the neck from the head to the body. In order to accomplish these results, the neck 9 is of hollow cylindrical form with the exception of enlargements 12 therein which are necessary in order to receive the screws 11, and furthermore, the head and the upper portion of the neck are so formed as to be separated from the adjacent portions of the body 5 of the piston. For example, the portion of the piston above the inwardly projecting part 10 thereof, which may be considered as an upwardly extending annular flange or projection 15, preferably is also provided with piston ring grooves into which rings 16 may be inserted. The projecting part 10 and flange 15 together form a recess or depression in the top of the piston into which the neck of the piston enters. The inner wall of the flange or extension 15 is spaced from the neck 9 in such a manner as to form an upright cylindrical space 17 between these two parts. A wall 9 of the neck portion may be made of such cross section as to limit to any desired degree the amount of heat conducted by this wall to the body portion of the piston. For example, as illustrated in Fig. 3, the upper portion of the neck 9 is of smaller cross section than other portions thereof to reduce the amount of heat conducted downwardly along the neck. The cross section of this neck may, consequently, be varied to any suitable extent to obtain the desired differences in temperature between the piston head and body. Furthermore, if desired, a plate 20 may be provided on which the lower edge of the neck seats and which may be made of material of relatively low heat conductivity. The neck 9, in the construction shown, contacts only at the lower extremity of its outer wall with the body of the piston, sufficient to properly center the head relatively to the body of the piston, and the main transfer of heat from the head to the body is effected through the plate 20. By selecting the material of which this plate is made according to its heat conductivity, further regulation of temperature differentials can be produced, and by varying the area of contact of the bottom of the neck with the plate 20, or with the inward projection 10 of the piston in case the plate 20 is omitted, further control of temperature differences in different parts of the piston may be obtained.

The upper end of the flange or extension 15 is spaced from the head of the piston in such a manner as to form a piston ring groove between these two parts of the piston. In the particular construction shown, the upper end of the flange or extension 15 forms the bottom wall of this ring groove and the top and inner walls thereof are formed by the piston head 8. This groove receives a piston ring 22 which is hereinafter referred to as the fire ring and it will be noted that the groove for the fire ring communicates with the space 17 between the flange 15 and the neck of the piston head through a small annular space 23.

As a result of the construction described, it will be noted that the fire ring 22 is spaced between the very hot piston head and the relatively cool upper end of the flange 15. Most of the heat from the piston which reaches the body of the piston is conducted from the lower end of the neck to the body below the ring zone, and consequently, only a portion of this heat reaches the upper end of the flange 15. During compression, combustion and expansion strokes, the fire ring will be forced by the pressure of gases in the cylinder to seat on the lower face of its groove which is formed by the upper end of the flange 15, so that this ring will be cooled not only by contact with this flange, but also by contact with the water jacketed cylindrical wall. This ring, while exposed to very high temperatures, is nevertheless kept cool enough in this manner so as not to lose its spring action or resiliency.

By means of the construction described, the groove or space 17 between a body portion and head of the piston serves not only as a heat insulation between the neck and the body of the cylinder but also due to variations in pressure acting on the cylinder head, there will be a flow or breathing of air or gas into and out of this space past the fire ring 22. This results in keeping the space between the fire ring and its groove clear of carbon deposit since the passage of air at high temperature past the fire ring tends to cause this carbon to burn.

The deposit of carbon between the fire ring and its groove which would result in the sticking of the ring, is prevented also by the fact that because of differences in temperature between the head and body of the piston, there will be differences in expansion and contraction, so that when the engine is stopped and the piston becomes cooled, the groove for the fire ring 22 will be contracted or of considerably less width than when the piston is hot. This contraction of the groove results in the crushing of any carbon which may have become deposited in the space between the ring and the opposite walls of the groove and such crushed carbon will be readily liberated from the groove or will be burned by the flow of air into and out of the space 17 during subsequent running of the engine at the usual high temperatures.

The result of the foregoing construction is that the fire ring 22 operates efficiently at all times and will thus in turn prevent the excessively hot gases acting on the piston head from contacting with the other piston rings 16. Furthermore, since the heat from the piston head is conducted to the body of the piston at a point below the ring zone, only a portion of this heat will pass to the ring zone, another portion passing down the skirt of the piston. Consequently, the construction described will result in keeping the piston rings 16 at relatively low temperatures, in spite of the high temperature of the piston head, so that no lubricating difficulties arise in connection with the piston ring 16. Heat is, of course, transmitted by radiation from the neck to the flange 15 across the space 17, but the amount of this heat is small in comparison with that conducted through the neck. By varying the width of the space 17, the amount of heat transmitted by radiation can be varied.

The construction described results in the formation of a closed space within the neck of the piston head when a plate 20 is employed. It will, of course, be understood that a ring may be employed in place of the plate 20, or, if desired, the plate may be entirely omitted. If, however, the plate is used, the space within the neck portion of the head may serve to further restrict the flow of heat from the piston head to the body and the plate also prevents the direct contact of lubricating oil with the piston head. The space within the neck confined by the plate 20 may be used to form a cell for the introduction of a cooling medium or the retention of a convector of heat, such for example as a salt, which melts at high temperatures to better convect heat, and which remains in solid form at lower temperatures, whereby excessive heating of the head may be prevented.

The construction described has the advantage that the head has a high operating temperature because of the removal of heat to the body by conduction, radiation and convection are limited, and as a result the body has a relatively low operating temperature. The piston rings 16 are thus prevented from sticking in their grooves since the temperature of these rings is maintained below that at which lubricating oil carbonizes or cokes. The construction described also ensures the proper operation of the fire ring so that this ring at all times protects the other rings from heat and carbon or dirt present in the combustion chamber. The construction shown may be used to advantage by designers of engines since it makes possible a control of the temperature at which the piston head will operate, as will a control of differences in temperature of the piston head and body. This control may be effected by varying the thickness of the annular wall of the neck, or by the area of the base of the neck which contacts with the body portion or plate 20, and the radiation of heat from the neck to the adjacent flange 15 may also be controlled by the width of the space 17. By varying the length of the neck and the location of the inwardly extending projection or shelf 10 with reference to the top of the body and to the ring zone, the distribution of heat to the body of the piston may be varied as desired. Further temperature control may also be obtained by making the several parts of the piston of materials having appropriate coefficients of thermal conductivity which will accelerate or retard the transmission of heat where different rates of heat transfer are desirable.

It will be obvious that the piston shown in the drawing is only one embodiment of this invention and it may be varied considerably without departing from the scope of this invention. It will also be understood that while the piston is shown in an upright position in Fig. 1 and the outer end of the piston is herein referred to as the "upper" end, the piston may nevertheless be used in other positions than that shown.

I claim as my invention:

1. A piston having head and body portions of approximately the same outside diameters disposed in end to end relation with an outwardly opening annular peripheral groove separating said portions at their outside peripheries, and also having an endwise elongated neck portion of reduced diameter connecting and coupling said portions and having its peripheral surface spaced from the inner wall of said body to form an annular chamber of substantial length measured endwise of the piston, and opening into said peripheral groove, a radially expansible resilient piston ring disposed in said groove and substantially thinner than the width of said groove so as to be capable of limited movement in a direction endwise of the piston and engageable with one side face only at a time of said groove, whereby heat of said head portion is conducted to the end of said body portion nearest the head portion solely through said neck, and said expansible ring is cooled by contact with the relatively cool adjacent end of said body portion.

2. A piston comprising a substantially cylindrical body portion having a piston ring zone at the upper part thereof, a head portion at the upper end of said body portion and having a part thereof of approximately the diameter of said body portion and spaced from the adjacent end of said body portion and forming therewith a groove, one of said piston portions having a neck of reduced diameter extending within and spaced from said ring zone and connected with said cylindrical body portion below said ring zone, said neck forming the sole connection between said head portion and said body portion through which heat of said head may be conducted to said body portion, and a radially expansible resilient piston ring loosely arranged in said groove to permit gas to flow through said groove into the space between said neck and said body portion and engageable with the upper end of said body portion for cooling said piston ring.

3. A piston having a substantially cylindrical body portion provided with an inwardly extending annular projection spaced at a distance from the upper edge thereof, a head at one end of said body portion and having a portion thereof of approximately the diameter of said body portion and spaced from the adjacent end of said body portion and forming therewith a groove and having a neck of reduced diameter extending within and spaced from said cylindrical body portion and secured to said projection of said body portion, a piston ring loosely arranged in said groove to permit gas to flow through said groove into the space between said neck and said body portion, whereby heat from said head is conducted to the end of said body portion nearest to said head only through said neck, said projection and the portion of said body portion extending upwardly beyond said projection, and whereby said piston ring is cooled by contact with the relatively cool end of said projection, and a substantially imperforate plate interposed between said neck and said projection.

4. A piston having a body portion and a head at one end thereof, said head having a neck portion of reduced diameter and which is secured at its free end to said body portion, said body portion being provided with a flange extending about and spaced from said neck and having its end arranged in spaced relation to the portion of said head which is of large diameter to form therewith a groove, whereby heat from said piston head is conducted to said outer end of said flange only by first passing along said neck and then along said flange to the end thereof, and a piston ring loosely arranged in said groove and arranged to be out of contact with said head when contacting with said flange, to provide a clearance through which gases may pass to the space between said flange and said neck and to provide a cooling surface against which said piston ring may seat.

5. A piston having a body portion and a head at one end thereof, said head having a neck portion of reduced diameter and which is secured at its free end to said body portion, said body portion being provided with a flange extending about and spaced from said neck and having its end arranged in spaced relation to the portion of said head which is of large diameter to form therewith a groove, whereby heat from said piston head is conducted to said outer end of said flange only by first passing along said neck and then along said flange to the end thereof, and a piston ring loosely arranged in said groove and arranged to be out of contact with said head when contacting with the cooling surface of said flange, and piston ring grooves formed in said flange.

ELWOOD T. LARKIN.